United States Patent
Jiang et al.

(10) Patent No.: US 10,268,270 B2
(45) Date of Patent: Apr. 23, 2019

(54) SYSTEM AND METHOD FOR SHAPE DEFORMATION AND FORCE DISPLAY OF DEVICES

(71) Applicant: Immersion Corporation, San Jose, CA (US)

(72) Inventors: Li Jiang, Stanford, CA (US); David M. Birnbaum, Oakland, CA (US); Remy Pieron, Portola Valley, CA (US); Christopher J. Ullrich, Ventura, CA (US); Juan Manuel Cruz-Hernandez, Montreal (CA); Robert Lacroix, Saint-Lambert (CA); Danny Grant, Laval (CA); Ali Modarres, Mont-Royal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 14/316,874

(22) Filed: Jun. 27, 2014

(65) Prior Publication Data
US 2014/0320400 A1    Oct. 30, 2014

Related U.S. Application Data

(63) Continuation of application No. 12/776,053, filed on May 7, 2010, now Pat. No. 8,803,798.
(Continued)

(51) Int. Cl.
*G06F 3/01* (2006.01)
*G06F 3/0488* (2013.01)

(52) U.S. Cl.
CPC .............. *G06F 3/016* (2013.01); *G06F 3/017* (2013.01); *G06F 3/04886* (2013.01);
(Continued)

(58) Field of Classification Search
CPC .................................. G06F 3/033; G06F 3/016
(Continued)

(56) References Cited

U.S. PATENT DOCUMENTS

| | | | | |
|---|---|---|---|---|
| 4,514,726 A | * | 4/1985 | Whetstone et al. | 345/163 |
| 5,354,250 A | * | 10/1994 | Christensen | A61M 29/00 |
| | | | | 482/91 |

(Continued)

FOREIGN PATENT DOCUMENTS

| | | |
|---|---|---|
| CN | 1444758 | 9/2003 |
| CN | 1444758 A | 9/2003 |

(Continued)

OTHER PUBLICATIONS

Official Communication issued in the corresponding PCT Application No. PCT/US2010/034078, dated Nov. 5, 2010.
(Continued)

*Primary Examiner* — William Boddie
*Assistant Examiner* — David J Lee
(74) *Attorney, Agent, or Firm* — Medler Ferro Woodhouse & Mills PLLC

(57) ABSTRACT

Various systems, devices, and methods for shape deformation of a haptic deformation display device are provided. For example, the haptic deformation display device may receive an input signal when the shape of the haptic deformation display device is in a first shape configuration. In response to the input signal, the haptic deformation display device may activate an actuator of the haptic deformation display device. The actuator may move a deformation component of the haptic deformation display device. The deformation component may at least partially defining a shape of the haptic deformation display device, thereby causing the shape of the haptic deformation display device to deform into a second shape configuration different from the first
(Continued)

shape configuration. The second shape configuration may be substantially maintained.

12 Claims, 5 Drawing Sheets

Related U.S. Application Data

(60) Provisional application No. 61/176,431, filed on May 7, 2009.

(52) U.S. Cl.
CPC ..... *A63F 2300/30* (2013.01); *A63F 2300/302* (2013.01); *G06F 2203/013* (2013.01); *G06F 2203/04809* (2013.01)

(58) Field of Classification Search
USPC ........................................................ 345/156
See application file for complete search history.

(56) References Cited

U.S. PATENT DOCUMENTS

| | | | |
|---|---|---|---|
| 5,864,105 A | 1/1999 | Andrews | |
| 6,088,643 A | 7/2000 | Long et al. | |
| 6,191,796 B1 | 2/2001 | Tarr | |
| 6,578,916 B2 | 6/2003 | Longhi et al. | |
| 6,641,480 B2 | 11/2003 | Murzanski et al. | |
| 6,693,626 B1* | 2/2004 | Rosenberg | G06F 3/016 345/156 |
| 6,697,044 B2 | 2/2004 | Shahoian et al. | |
| 6,705,868 B1 | 3/2004 | Schleppenbach et al. | |
| 6,717,573 B1 | 4/2004 | Shahoian et al. | |
| 6,839,663 B1* | 1/2005 | Temkin | G06T 17/00 318/568.11 |
| 6,929,481 B1 | 8/2005 | Alexander et al. | |
| 6,995,744 B1* | 2/2006 | Moore | G06F 3/016 345/156 |
| 7,098,776 B2 | 8/2006 | Chang et al. | |
| 7,182,691 B1 | 2/2007 | Schena | |
| 7,196,688 B2* | 3/2007 | Schena | G01D 7/007 345/156 |
| 7,228,212 B2 | 6/2007 | Hijikata et al. | |
| 7,277,080 B2 | 10/2007 | Goulthorpe | |
| 7,339,572 B2 | 3/2008 | Schena | |
| 7,355,595 B2 | 4/2008 | Bathiche et al. | |
| 8,596,716 B1 | 12/2013 | Caruso | |
| 2002/0054060 A1 | 5/2002 | Schena | |
| 2002/0058549 A1 | 5/2002 | Armstrong | |
| 2002/0163498 A1 | 11/2002 | Chang et al. | |
| 2003/0210259 A1* | 11/2003 | Liu | G06F 3/016 715/702 |
| 2003/0227374 A1 | 12/2003 | Ling et al. | |
| 2004/0046739 A1 | 3/2004 | Gettemy | |
| 2004/0049743 A1* | 3/2004 | Bogward | G06F 1/162 715/262 |
| 2005/0010326 A1* | 1/2005 | Hayward | G06F 19/3437 700/182 |
| 2005/0057528 A1 | 3/2005 | Kleen | |
| 2005/0156892 A1* | 7/2005 | Grant | G06F 3/016 345/167 |
| 2005/0235032 A1* | 10/2005 | Mason, III | G06F 3/016 709/204 |
| 2007/0021208 A1* | 1/2007 | Mao | G06F 3/017 463/36 |
| 2007/0152974 A1 | 7/2007 | Kim et al. | |
| 2007/0182708 A1 | 8/2007 | Poupyrev et al. | |
| 2007/0244641 A1 | 10/2007 | Altan et al. | |
| 2008/0100568 A1 | 5/2008 | Koch et al. | |
| 2008/0169911 A1 | 7/2008 | Klinghult et al. | |
| 2008/0204420 A1* | 8/2008 | Dunnigan | G06F 3/016 345/173 |
| 2008/0246735 A1 | 10/2008 | Reynolds et al. | |
| 2008/0274769 A1 | 11/2008 | Linden | |
| 2009/0007758 A1 | 1/2009 | Schlosser et al. | |
| 2009/0085879 A1 | 4/2009 | Dai et al. | |
| 2009/0231277 A1 | 9/2009 | Peterson et al. | |
| 2010/0162109 A1* | 6/2010 | Chatterjee | G06F 3/016 715/702 |
| 2010/0283731 A1 | 11/2010 | Grant et al. | |

FOREIGN PATENT DOCUMENTS

| | | |
|---|---|---|
| CN | 1744803 A | 3/2006 |
| JP | 2005328270 A | 11/2005 |
| JP | 2012526331 A | 10/2012 |
| WO | 2008086904 A1 | 7/2008 |
| WO | 2009045748 A1 | 4/2009 |

OTHER PUBLICATIONS

Norio Nakamura et al.; "An Innovative Non-Grounding Haptic Interface 'GyroCubeSensuous' displaying Illusion Sensation of Push, Pull and Lift"; National Institute of Advance Industrial Science and Technology; University of Tsububa; ACM; New Your; 2005.

Norio Nakamura et al.; "Development of a Force and Torque Hybrid Display GyroCubeStick"; Second Joint EuroHaptics Conference and Symposium on Haptic Interfaces for Virtual Environment and Teleoperator systems; 2005 IEEE.

Norio Namaura et al.; "Development of Fingertip Type Non-grounding Force Feedback Display"; Second Joint EuroHaptics Conference and Symposium on Haptic Interfaces for Virtual Environment and Teleoperator systems (WHC'07); 2007 IEEE.

Colin Sindwells et al.; "TorqueBAR: An Ungrounded Haptic Feedback Device"; ICMI'03; Nov. 5-7, 2003; Vancouver, British Columbia, Canada; Copyright 2003 ACM 1-58113-621-08/03/0011.

Tomohiro Amemiya et al.; "Virtual Force Display: Direction Guidance using Asymmetric Acceleration via Periodic Translational Motion"; Proceedings of the First Joint Eurohaptics Conference and Symposium on Haptic Interfaces for Vitrual Environment and Teleoperator Systems; 2005 IEEE.

Tomohiro Amemiya et al.; "Lead-Me Interface for a Pulling Sensation from Hand-held Devices"; ACM Transactions on Applied Perceptions; vol. 5; No. 3; Article 15; Publication Date: Aug. 2008; pp. 15-15:17.

Tomohiro Amemiya et al.; "Haptic Direction Indicator for Visually Impaired People Based on Pseudo-Attraction Force"; vol. I No. 5; Mar. 2009; ISSN: 1697-9613; pp. 23-34.

Olivier Bau et al.; "BubbleWrap: A Textile-Based Electromagnetic Haptic Display" CHI 2009; Apr. 4-9, 2009; Boston, Massachusettes, USA, ACM 978-1-60558-247-4/09/04.

Hiroaki Yano et al.; "Development of Non-grounded Haptic Interface Using the Gyro Effect"; Proceedings of the 11th Symposium on Haptic Interfaces for Virtual Environment and Teleoperator Systems (HAPTICS'03); 2003 IEEE; pp. 1-8.

Fabian Hemmert et al.; "Shape-Changing Mobiles: Tapering in One-Dimensional Deformational Displays in Mobile Phones"; TEI 2010; Jan. 25-27, 2010; Cambridge, Massachusetts, USA; copyright 2010 ACM 978-1-60558-841-4/10/01; pp. 249-252.

Fabian Hemmert et al.; "Dynamic Knobs: Shape Change as a Means of Intercation on a Mobile Phone"; CHI 2008; Apr. 5-10, 2008; Florence, Italy; ACM 978-1-60558-012-8/08/04; pp. 2309-2314.

"Touch User Interface—Touch Screen and Multi Touch"; Jun. 12, 2009; http://www.touchuserinterface.com2009/06/shape-changing-mobile-phone-concept.html.

G. Michelitsch et al.; Haptic Chameleon: A New Concept of Shape-Changing User Interface Controls with Force Feedback; CHI 2004; Apr. 24-29, 2004; Vienna, Austria; ACM 1-58113-703-06/04/0004; pp. 1305-1308.

Final Office Action dated April 26, 2018 in co-pending U.S. Appl. No. 12/776,121.

Office Action dated Apr. 28, 2018 in corresponding Chinese Patent Application No. 201610131812.9.

Non-Final Office Action dated Sep. 13, 2018 in U.S. Appl. No. 12/776,121.

(56) References Cited

OTHER PUBLICATIONS

Office Action dated Dec. 18, 2018 in CN Appl. 201610131812.9.
Applicant-Initiated Interview Summary dated Nov. 29, 2018 in U.S. Appl. No. 12/776,121.

* cited by examiner

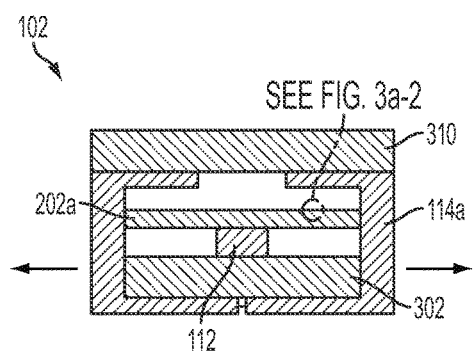
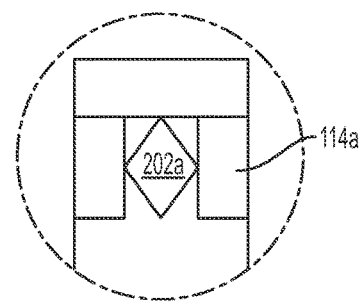
FIG. 3a-1  FIG. 3a-2
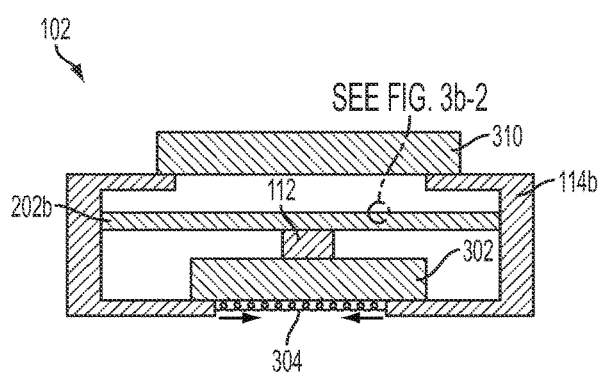
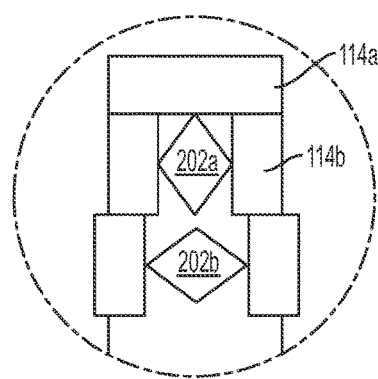
FIG. 3b-1  FIG. 3b-2

SYSTEM AND METHOD FOR SHAPE DEFORMATION AND FORCE DISPLAY OF DEVICES

CROSS-REFERENCE TO RELATED APPLICATIONS

This application is a continuation of application Ser. No. 12/776,053 filed on May 7, 2010 (herein incorporated by reference in its entirety), which claims priority to U.S. provisional patent application Ser. No. 61/176,431, filed May 7, 2009, which is hereby incorporated by reference in its entirety.

FIELD

The disclosure relates to systems, devices, and methods for haptic interface devices and more particularly to shape deformation of devices.

BACKGROUND

Devices increasingly employ haptic actuators to generate haptic feedback in order to enrich the user interface experience. For example, cell phones, game controllers, automotive controls, and other devices use haptic feedback to convey information to a user. In some existing systems, different haptic feedback parameters such as frequency, magnitude, and/or other parameters may be used to communicate different information. Thus, the user may receive different information via haptic feedback in addition to or instead of audio/visual feedback.

SUMMARY

In one embodiment, a haptic deformation display device may receive an input signal when the shape of the haptic deformation display device is in a first shape configuration. In response to the input signal, the haptic deformation display device may activate an actuator of the haptic deformation display device. The actuator may move a deformation component of the haptic deformation display device. The deformation component may at least partially define a shape of the haptic deformation display device, thereby causing the shape of the haptic deformation display device to deform into a second shape configuration different from the first shape configuration. The second shape configuration may be substantially maintained.

BRIEF DESCRIPTION OF THE DRAWINGS

FIGS. 3a-1 and 3a-2 are cross-sectional views of a haptic deformation device in a non-deformed shape configuration with a super-imposed partial view of the non-deformed shape as illustrated in FIG. 2a, according to various embodiments of the invention.

FIGS. 3b-1 and 3b-2 are cross-sectional views of a haptic deformation device in a deformed shape configuration with a super-imposed partial view of the deformed shape as illustrated in FIG. 2b, according to various embodiments of the invention.

DETAILED DESCRIPTION

Various embodiments of the invention relate to systems, devices and methods for shape deformation of a haptic deformation device. For example, the system may include a haptic deformation device that receives a shape input signal when the haptic deformation device is in a first shape configuration. The haptic deformation device may include an actuator that moves a deformation component of the haptic deformation device in response to the shape input signal.

The deformation component at least partially defines the shape of the haptic deformation device, thereby causing the shape of the haptic deformation device to deform into a second shape configuration different from the first shape configuration when the deformation component is moved by the actuator. The haptic deformation device may include a game controller that is coupled to a game console or other host computer, a communication device such as a cellular telephone, a computer peripheral such as a mouse, a gaming device that changes shape based on events in a game being run on the gaming device, or other device that includes an actuator configured to move a deformation component in response to a shape input signal.

Figure 1:
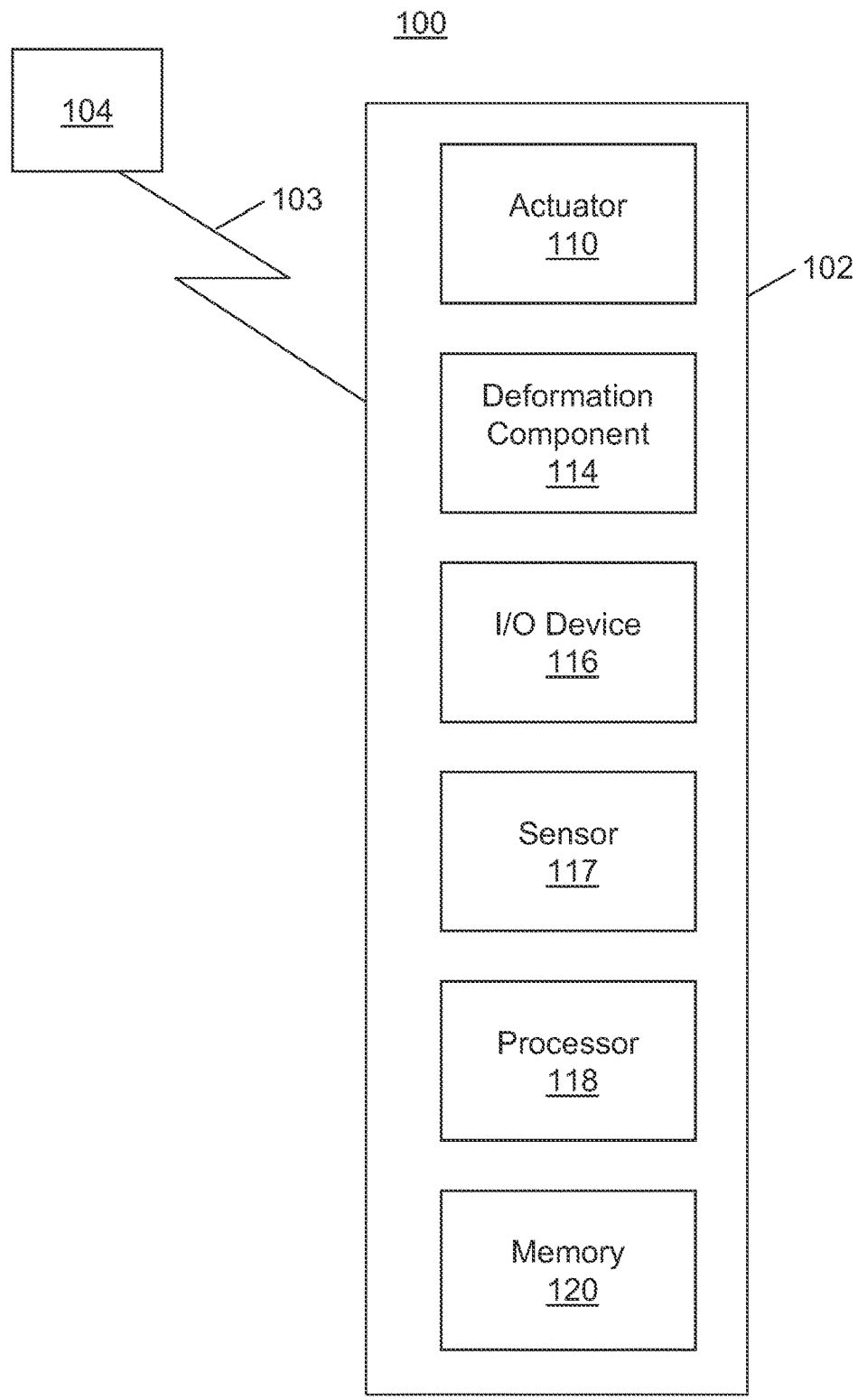
FIG. 1 is a block diagram of a system for shape deformation, according to various embodiments of the invention.

FIG. 1 is a block diagram of a system 100 for shape deformation, according to various embodiments of the invention. System 100 may include a haptic deformation display device 102 coupled to a remote device 104 via link 103. Link 103 may be a wireless link, a wired link, and/or other link between haptic deformation display device 102 and remote device 104. Haptic deformation display device 102 may include a game controller, a communication device, a computer peripheral such as a mouse, and/or other device that is configured to deform its shape configuration in response to a shape input signal. "Shape configuration" refers to a shape of haptic deformation display device 102 as felt by a user. "Deforming" a shape from a first shape configuration to a second shape configuration refers to a macro change in the shape such that a user is able to perceive a change in the shape by touch and/or sight. A macro change may differ from a vibration in that the change occurs in a single cycle or in a small number of cycles instead of a high number of cycles per second of change on a periodic basis (e.g., 25-100 Hz) as occurs with a typical vibration. Remote device 104 may include a game console or other computing device, another haptic deformation device, a cellular tower, and/or other device coupled to haptic deformation display device 102. Although illustrated in FIG. 1 as being coupled to remote device 104, in some embodiments, haptic deformation display device 102 may be a standalone device such as, for example, a handheld gaming device.

Through various modules and components, haptic deformation display device 102 may deform its outer shape in response to the shape input signal. For example, haptic deformation display device 102 may include an actuator 110, a deformation component 114, an input/output device 116 ("IO device 116"), a sensor 117, a processor 118, a memory 120, and/or other components.

Actuator 110 may be coupled to and move deformation component 114 in response to the shape input signal. Actuator 110 may include a piezo-electric actuator, rotating/linear actuator, a solenoid, an electroactive polymer actuator, shape memory alloy, and/or other actuator. In some embodiments, deformation component 114 at least partially defines a shape of haptic deformation display device 102. In some embodiments, deformation component 114 may form at least a portion of a housing of haptic deformation display device 102. In some embodiments, deformation component 114 may be housed inside a flexible housing that deforms according to movement of deformation component 114. Thus, movement of deformation component 114 may deform the outer shape of haptic deformation display device In some embodiments, actuator 110 may generate one or more haptic effects in addition to or instead of moving deformation component 114. In this manner, for example, a user may receive the haptic effect in addition to or instead of a shape deformation of haptic deformation display device 102.

IO device 116 may include, among other things, one or more of a display, a touch screen, a light, a speaker, a button, and/or other user interface component for input and output.

According to various embodiments of the invention, sensor 117 may include sensors and/or encoders such as a force sensor, a torque sensor, a pressure sensor, or other sensor configured to sense an input. Sensor 117 may be disposed on an outer surface of haptic deformation display device 102 (such as on a housing of haptic deformation display device 102), disposed inside the housing, and/or be included as part of actuator 110. In some embodiments, for example, actuator 110 may include an actuator configured to both actuate and sense inputs such as electroactive polymer actuators.

In some embodiments, sensor 117 may sense input such as a force, a shaking, a gesture, or other input from a user to a housing or other component of haptic deformation display device 102.

In some embodiments, sensor 117 may generate sensory input representative of the sensed input. The sensory input may be used to cause deformation demands such as shape configurations to haptic deformation display device 102 and vice versa. In other words, in some embodiments, sensor 117 generates sensory input and causes haptic deformation display device 102 to deform its shape in response to the sensory input.

In some embodiments, sensor 117 may be used to communicate inputs to and/or from remote device 104. For example, sensor 117 may receive input signals from remote device 104 and/or cause sensory input to be transmitted to remote device 104. In this manner, remote device 104 may receive and respond to sensory input from haptic deformation display device 102 and/or haptic deformation display device 102 may deform its shape in response to input from remote device 104.

Thus, in some embodiments, haptic deformation display device 102 may be configured to deform its shape, sense inputs (such as force from a user) imparted to a housing or other component of haptic deformation display device 102, and/or communicate (transmit and/or receive) signals with remote device 104.

Processor 118 may be configured to perform various functions of haptic deformation display device 102 such as, for example, communicating information to and from a user, causing actuator 110 to move deformation component 114, and/or other functions.

Memory 120 may store instructions for configuring processor 118 to perform the various functions of haptic deformation display device 102 and/or store other information related to haptic deformation display device 102. For example, memory 120 may include shape instructions for associating a shape input signal with a particular haptic response to be output by actuators 110 that causes a particular shape configuration of haptic deformation display device 102. In some embodiments, memory 120 associates different shape input signals with different forces to be output by actuator 110 in a lookup table. This association may be used to cause different shape deformations based on the different shape input signals. In this manner, processor 118 may perform a lookup of the shape input signal to cause actuator 110 to deform the shape of haptic deformation display device 102.

In some embodiments, haptic deformation display device 102 may receive the shape input signal from remote device 104. For example, remote device 104 may include a gaming console that runs a game application and communicates the shape input signal to haptic deformation display device 102. The shape input signal may be related to or otherwise correspond with game events. The game events may be user-driven events or user-independent events. User-driven events include events that respond to user actions such as, for example, when a user manipulates an object such as a tennis ball in a tennis gaming application. User-independent events include events that occur independent of user actions such as events occurring in the game beyond the control of the user. In some embodiments, sensor 117 may transmit sensory input to remote device 104. In response to the sensory input, remote device 104 may cause haptic deformation display device 102 to deform its shape configuration. In some embodiments, remote device 104 may be another haptic deformation display device. Thus, haptic deformation display device 102 may communicate with various remote devices and receive and/or transmit signals such as a shape input signal that cause shape deformation of haptic deformation display device 102 and/or remote device 104. In this manner, a user of remote device 104 may communicate a shape input signal that cause haptic deformation display device 102 to deform its shape configuration.

In some embodiments, haptic deformation display device 102 may locally determine the shape input signal (thus, receiving the shape input signal from itself). In some embodiments, processor 118 may locally generate the shape input signal in response to a manipulation of IO device 116. For example, IO device 116 may include one or more user inputs that when manipulated causes processor 118 to generate the shape input signal. In some embodiments, IO device 116 includes one or more buttons that when pressed cause haptic deformation display device 102 to deform into one or more shapes corresponding to the pressed button. For example, a user may press a first button that causes haptic deformation display device 102 to deform into a first shape such as a ball, press a second button that causes haptic deformation display device 102 to deform into a second shape such as a bat, press a third button that causes haptic deformation display device 102 to deform into a dynamically moving wave, and/or manipulate other IO device 116 inputs that causes haptic deformation display device 102 to deform into one or more shapes. In some embodiments, processor 118 may locally generate the shape input signal based sensory input from sensor 117.

In some embodiments, processor 118 may locally generate the shape input signal in response to information from remote device 104. For example, haptic deformation display device 102 may receive event information related to an event occurring at remote device 104. In response to the event information, haptic deformation display device 102 may generate the shape input signal, thereby locally determining the shape input signal based on information received from remote device 104.

In an operation according to various embodiments of the invention, shape deformation device 102 may receive a shape input signal. The shape input signal may be received from a remote source such as remote device 104 or a local source such as processor 118. For example, when running a tennis game application, remote device 104 may communicate a shape input signal that causes haptic deformation display device 102 to form the shape of a tennis racket handle. When a game character is holding a tennis ball, the shape input signal may cause haptic deformation display device 102 to approximate the shape of a ball. Regardless of the source of the shape input signal, haptic deformation display device 102 causes actuator 110 to move deformation component 114 in response to the shape input signal. Movement of deformation component 114 causes an outer shape of haptic deformation display device 102 to deform from a first shape configuration to a different shape configuration.

FIG. 1 and other drawing figures are illustrative only and not intended to be limiting. Those having skill in the art will appreciate that various configurations, additions, and/or omissions may be used. For example, although illustrated as having a single actuator 110, a single deformation component 114, and a single IO device 116, various numbers and configurations of either of these and other components may be used according to particular needs.

Figure 2A:
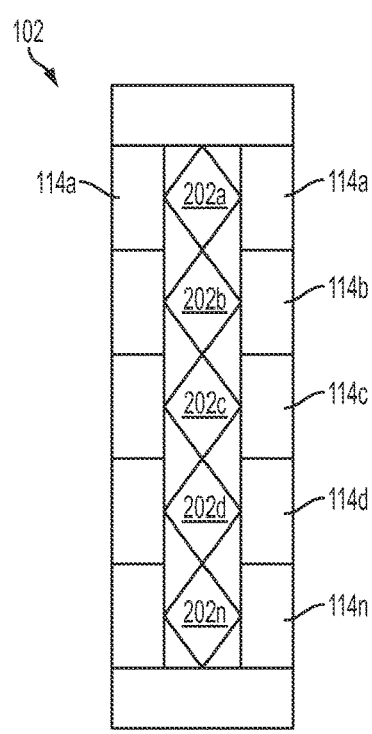
FIG. 2a is a block diagram of a cutaway view of a haptic deformation device in a non-deformed shape configuration, according to various embodiments of the invention.

FIG. 2a is a block diagram of a cutaway view of haptic deformation display device 102 in a non-deformed shape configuration, according to various embodiments of the invention. According to various embodiments, haptic deformation display device 102 includes arms 202a, 202b, 202c, 202d, 202n ("arm 202" for convenience) each coupled to one or more actuators (not illustrated in FIG. 2a). In some embodiments, each arm 202 may be coupled to its own actuator. In some embodiments, two or more arms 202 may share a single actuator using various linkages (not illustrated in FIG. 2a). In some embodiments, arm 202 may form at least a portion of actuator 110, thereby at least partially forming a moving portion of actuator 110.

In some embodiments, an arm 202 includes a shape that is oblong. In other words, arm 202 may include a first dimension such as a length along a plane that is longer than a second dimension such as a width along the plane. Thus, rotation of arm 202 (illustrated by arrows described in FIG. 2b below) about an axis perpendicular to the plane causes arm 202 to contact any objects along a rotation path of arm 202, causing arm 202 to contact objects in the rotation path as arm 202 rotates.

In some embodiments, each arm 202 may be coupled to one or more respective deformation components 114a, 114b, 114c, 114d, 114n ("deformation component 114" for convenience). Deformation component 114 may be positioned along the rotation path of arm 202, thereby being moved as arm 202 is rotated. Deformation component 114 at least partially defines the shape of haptic deformation display device 102. Thus, the shape of haptic deformation display device 102 may deform into a second shape configuration different from the first shape configuration when deformation component 114 is moved. In some embodiments, deformation component 114 forms at least a portion of a housing of haptic deformation display device 102. In some embodiments, deformation component 114 is enclosed within a flexible housing such that movement of deformation component 114 moves the flexible housing. In either implementation, movement of deformation component 114 causes haptic deformation display device 102 to deform into the second shape configuration.

In operation, an actuator causes arm 202 to rotate based on a shape input signal. Deformation component 114 is positioned along the rotation path of arm 202 such that deformation component 114 is moved as arm 202 is rotated, thereby causing the shape of haptic deformation display device 102 to deform.

Figure 2B:
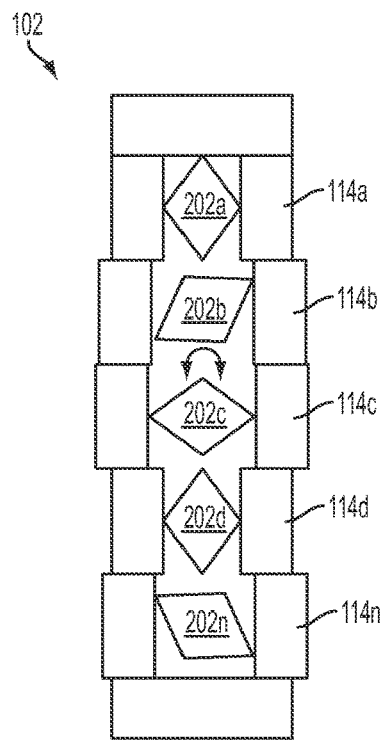
FIG. 2b is a block diagram of a cutaway view of a haptic deformation device in a deformed shape configuration, according to various embodiments of the invention.

FIG. 2b is a block diagram of a cutaway view of a device in a deformed shape configuration, according to various embodiments of the invention. As illustrated in FIG. 2b, arm 202a and arm 202d are in an original position, which may correspond to a non-deformed shape configuration of deformation component 114. Arms 202b, 202c, and 202n are rotated with respect to the original position.

In some embodiments, arm 202 may be rotated according to one or more rotation parameters. The rotation parameters may include, for example, a rotational angle, magnitude (such as torque), and/or other parameters used to activate the actuator.

In some embodiments, each arm may be rotated according to a rotational angle by which arms 202b, 202c, and 202n are rotated. Different rotational angles may result in different amounts by which deformation components 114b, 114c, and 114n are moved. In other words, different rotation angles in which arm 104 is rotated causes a different deformation effect on deformation component 114.

In some embodiments, each arm 202 may be rotated at different speeds and/or different angles relative to a neighboring arm. For example, arm 202a may be rotated at a different speed than arm 202b, which may be accomplished by applying more torque to arm 202a than to arm 202b. Thus, different haptic effects and/or shape configurations may be caused by different rotational speeds.

In some embodiments, movement of arms 202 may be coordinated to create a "waveform effect." The waveform effect may be accomplished by rotating arms 202 at different rotation angles relative to one another to move deformation components 114 in a manner that simulates a wave shape. The wave shape may be defined by one or more apexes, where an apex occurs when a deformation component 114 is maximally extended, which may occur when an arm 202 is rotated substantially at 90 degrees in either direction with respect to the original position, thereby maximally extending deformation component 114.

In some embodiments, the waveform effect may be substantially continuously updated such that the one or more apexes move from a first location of haptic deformation display device 102 to a second location of haptic deformation display device 102. This may be accomplished, for example, by causing arms 202 to rotate at substantially 90 degrees relative to the original position at different times such that an apex moves from the first location to the second location. An arm 202 adjacent to the apex may be rotated from zero to approximately 90 degrees with respect to the original position, where rotational angles closer to zero degrees result in deformation components 114 further from the apex while rotational angles closer to 90 degrees result in deformation components closer to the apex.

Figure 2C:
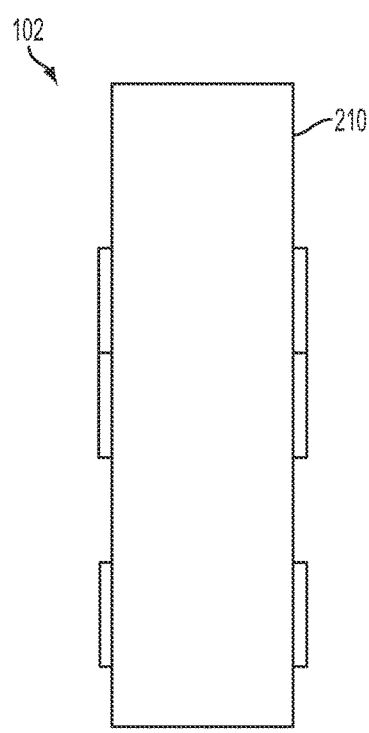
FIG. 2c is a block diagram of a haptic deformation device with a top plate in a deformed shape configuration, according to various embodiments of the invention.

FIG. 2c is a block diagram of haptic deformation display device 102 with a top plate 210 in a deformed shape configuration, according to various embodiments of the invention. In some embodiments of the invention, top plate 210 may protect an inner portion of haptic deformation display device 102 upon deformation. In these embodiments, haptic deformation component 114 forms at least a portion of a housing of haptic deformation display device 102.

Figure 2D:
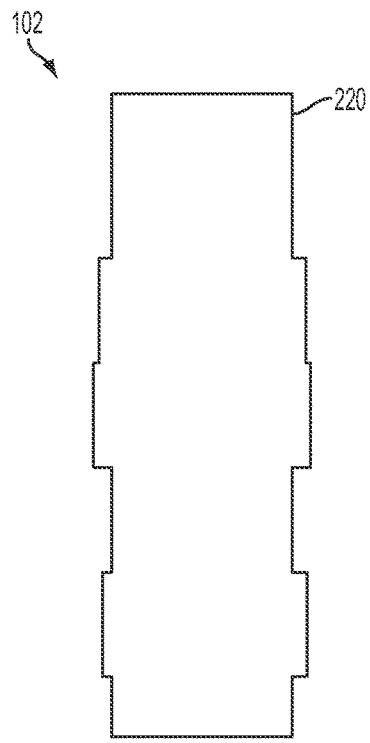
FIG. 2d is a block diagram of a haptic deformation device with a flexible housing in a deformed shape configuration, according to various embodiments of the invention.

FIG. 2d is a block diagram of haptic deformation display device 102 with a flexible housing 220 in a deformed shape configuration, according to various embodiments of the invention. In some embodiments of the invention, deformation component 114 is disposed inside deformable housing 220. In these embodiments, deformable housing 220 may be formed using flexible material, such as rubber or other flexible material, that may deform based on movement of deformation component 114.

In FIGS. 2a, 2b, 2c, and 2d, while five deformation components are illustrated, in some embodiments, various shapes, sizes, and number of components may be used to achieve greater or lesser granularity of shape profile in a dynamic manner. For instance, water wave forms can be realistically generated on this device using a much larger number of deformation components in one embodiment.

FIGS. 3a-1 and 3a-2 are cross-sectional views of a haptic deformation display device 102 in a non-deformed shape configuration with a super-imposed partial view of the non-deformed shape as illustrated in FIG. 2a, according to various embodiments of the invention. In some embodiments of the invention, haptic deformation display device 102 includes a top plate 310 and a bottom plate 302 coupled to deformation component 114 (illustrated as deformation component 114a). Arm 202a is coupled to actuator 112, which may be coupled to bottom plate 302 for support. When activated, actuator 112 rotates arm 202a, thereby causing arm 202a to move deformation component 114a in a direction indicated by arrows. Although shown as being centered, actuator 112 may be position offset from the center.

FIGS. 3b-1 and 3b-2 are cross-sectional views of a haptic deformation display device 102 in a deformed shape configuration with a super-imposed partial view of the deformed shape as illustrated in FIG. 2b, according to various embodiments of the invention. In some embodiments of the invention, haptic deformation display device 102 includes a top plate 310 and a bottom plate 302 coupled to deformation component 114 (illustrated as deformation component 114b). Arm 202b is coupled to actuator 112, which may be coupled to bottom plate 302 for support. As illustrated, arm 202b is rotated by actuator 112 such that deformation component 114b is extended, thereby deforming the shape of haptic deformation display device 102. In some embodiments, haptic deformation display device 102 includes a returning force component 304 such as a spring or other component that causes a returning force in a direction indicated by arrows. Thus, when arm 202b is rotated from the original position to a rotational angle of 90 degrees relative to the original position, deformation component 114 may be moved against the returning force. When arm 202b is rotated from a rotational angle of 90 degrees to 180 degrees (or back to the original position), the returning force may cause deformation component 114 to move in the direction indicated by arrows.

Figure 4:
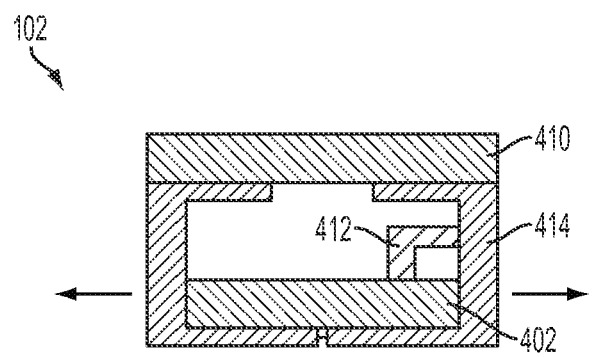
FIG. 4 is a cross-sectional view of a haptic deformation device, according to various embodiments of the invention.

FIG. 4 is a cross-sectional view of haptic deformation display device 102, according to various embodiments of the invention. In some embodiments of the invention, haptic deformation display device 102 includes a bottom plate 402, a top plate 410, an actuator 412, and a deformation component 414. Deformation component 414 may be movably coupled to bottom plate 402 and top plate 410. Actuator 412 may be grounded to bottom 402 or other component of haptic deformation display device 102 and may directly cause deformation component 414 to move in a direction indicated by the arrow illustrated in FIG. 4. Thus, in some embodiments, actuator 412 may directly move deformation component 414, thereby deforming the shape configuration of haptic deformation display device 102.

Figure 5:
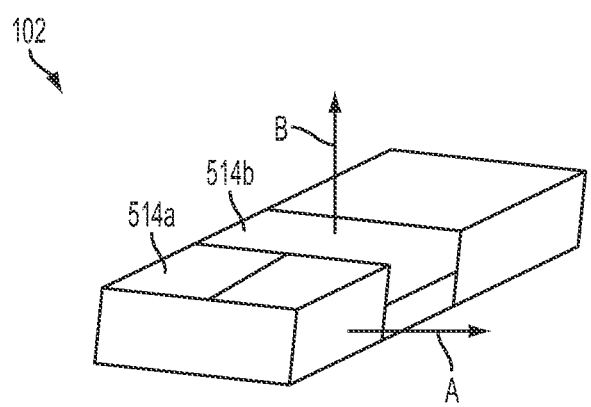
FIG. 5 is a perspective view of a block diagram of a haptic deformation device, according to various embodiments of the invention.

FIG. 5 is a perspective view of a block diagram of haptic deformation display device 102, according to various embodiments of the invention. In some embodiments of the invention, haptic deformation display device 102 includes a deformation component 514a and a deformation component 514b. As illustrated in FIG. 5, deformation component 514a may be moved in a first direction indicated by the arrow labeled "A" while deformation component 514b may be moved in a second direction indicated by the arrow labeled "B." As would be appreciated by those having skill in the art, other numbers and configurations of deformation component 514a and deformation component 515b may be used as appropriate. Thus, in some embodiments, haptic deformation display device 102 may include deformation components that are moved in different directions, thereby allowing deformation of the shape configuration in three dimensional space.

Figure 6:
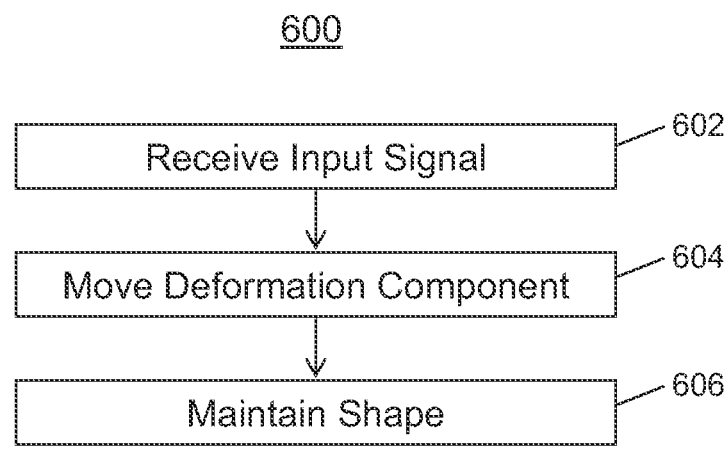
FIG. 6 is a flow diagram of a process for shape deformation, according to various embodiments of the invention.

FIG. 6 is a flow diagram of a process 600 for shape deformation, according to various embodiments of the invention. FIG. 6 is a flow diagram of an example process 600 for shape deformation, according to various embodiments of the invention. The various processing operations depicted in the flow diagram of FIG. 6 (and in the other drawing figures) are described in greater detail herein. The described operations for a flow diagram may be accomplished using some or all of the system components described in detail above and, in some embodiments, various operations may be performed in different sequences. According to various embodiments of the invention, additional operations may be performed along with some or all of the operations shown in the depicted flow diagrams. In yet other embodiments, one or more operations may be performed simultaneously. Accordingly, the operations as illustrated (and described in greater detail below) are examples by nature and, as such, should not be viewed as limiting.

In an operation 602, an input signal may be received. In some embodiments, the input signal may include a haptic shape input signal that causes a device to deform its shape configuration into, for example, a shape of a ball. In some embodiments, the input signal may include information that describes one or more events, such as a tennis serve, occurring at a remote device such as a gaming console. In these embodiments, the haptic shape input signal may be determined locally based on the one or more events. For example, an input signal indicating a tennis serve is occurring at a remote device may be received by the device. In response, the device may determine a haptic shape input signal that causes the device to deform its shape configuration into a ball.

In an operation 604, a deformation component may be moved in response to the received input signal. The deformation component defines at least a portion of the shape configuration of the device. Thus, movement of the deformation component deforms the shape configuration. In some embodiments, an actuator may move the deformation component directly or indirectly in response to the input signal.

In an operation 606, the deformed shape configuration may be substantially maintained until another input signal is received and/or the received input signal causes continuous shape deformation. In other words, in some embodiments, the input signal causes the deformed shape configuration to be substantially maintained until further instructed. In some embodiments, the input signal causes the deformed shape configuration to be changed after an interval of time, thereby causing the device to deform the shape configuration at intervals.

Figure 7:
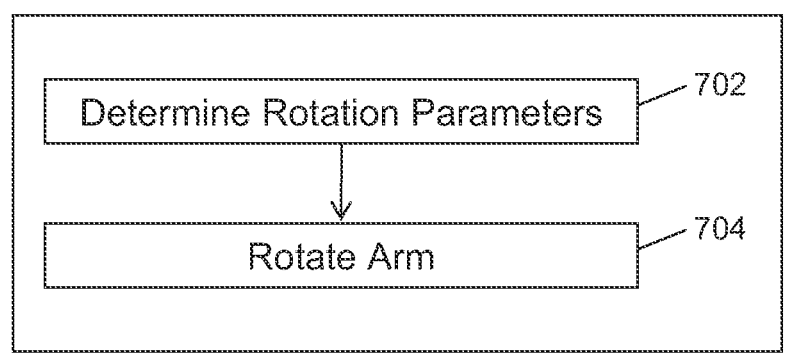
FIG. 7 is a flow diagram of a process for moving a deformation component, according to various embodiments of the invention.

FIG. 7 is a flow diagram of a process 604 for moving a deformation component, according to various embodiments of the invention. In an operation 702, one or more rotation parameters may be determined based on the received input signal. The rotation parameters may describe parameters used to rotate an arm coupled to an actuator, wherein a rotation of the arm causes the deformation component to move. In an operation 704, the actuator may rotate the arm based on the determined rotation parameters, thereby moving the deformation component.

Embodiments of the invention may be made in hardware, firmware, software, or any suitable combination thereof. Embodiments of the invention may also be implemented as instructions stored on a machine-readable medium, which may be read and executed by one or more processors. A tangible machine-readable medium may include any mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Intangible machine-readable transmission media may include intangible forms of propagated signals, such as carrier waves, infrared signals, digital signals, and other intangible transmission media. Further, firmware, software, routines, or instructions may be described in the above disclosure in terms of specific exemplary embodiments of the invention, and performing certain actions. However, it will be apparent that such descriptions are merely for convenience and that such actions in fact result from computing devices, processors, controllers, or other devices executing the firmware, software, routines, or instructions.

Embodiments of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other embodiments, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A method performed by a handheld haptic deformation device for deforming a flexible housing of the handheld haptic deformation device, comprising:
generating or receiving, by the handheld haptic deformation device, a shape input signal when the flexible housing of the handheld haptic deformation device is in a first shape configuration, wherein the handheld haptic deformation device comprises a plurality of deformation components contained within the flexible housing, and wherein the shape input signal is generated by the handheld haptic deformation device or by a host computer in communication with the handheld haptic deformation device and is based on a shape of a virtual object being held by a character in an application that either is executing on the handheld haptic deformation device or is in communication with the handheld haptic deformation device;
activating a plurality of actuators of the handheld haptic deformation device based on the shape input signal,
wherein the plurality of actuators are configured to move the plurality of deformation components based on the shape input signal,
wherein movement of the plurality of deformation components by the plurality of actuators causes a first plurality of corresponding regions of the flexible housing of the handheld haptic deformation device to deform in a first direction and causes a second plurality of corresponding regions of the flexible housing that are opposite to the first plurality of corresponding regions to deform in a second and opposite direction, and
wherein deformation of the first plurality of corresponding regions by the plurality of deformation components and deformation of the second plurality of corresponding regions by the plurality of deformation components cause the handheld haptic deformation device to deform into a second shape configuration that is different from the first shape configuration and that approximates the shape of the virtual object being held by the character in the application; and
substantially maintaining the second shape configuration until another shape input signal is generated or received by the handheld haptic deformation device.

2. The method of claim 1, wherein the application is executed within the handheld haptic deformation device.

3. The method of claim 2, wherein the application is a gaming application.

4. The method of claim 1, wherein the shape input signal is further based upon a sensory input that is sensed by at least one sensor of the handheld haptic deformation device.

5. The method of claim 4, wherein the sensory input comprises a user gesture.

6. The method of claim 1, wherein the flexible housing comprises a flexible material that covers the plurality of deformation components, and wherein movement of the plurality of deformation components deforms the flexible material covering the plurality of deformation components.

7. A handheld haptic deformation device, comprising:
a plurality of actuators;
a flexible housing having a flexible material;
a plurality of deformation components contained within the flexible housing of the handheld haptic deformation device, wherein the flexible material of the flexible housing covers the plurality of deformation components; and
a processor configured to receive or generate a shape input signal and to activate the plurality of actuators based on the shape input signal, wherein the shape input signal is based on a shape of a virtual object being held by a character in an application that either is executing on the handheld haptic deformation device or is in communication with the handheld haptic deformation device, wherein the plurality of actuators are configured to move the plurality of deformation components based on the shape input signal, wherein the plurality of deformation components, when moved by the plurality of actuators, are configured to deform a first plurality of corresponding regions of the flexible housing in a first direction and to deform a second plurality of corresponding regions of the flexible housing in a second and opposite direction, wherein the second plurality of corresponding regions are opposite the first plurality of corresponding regions, wherein deformation of the first plurality of corresponding regions by the plurality of deformation components and deformation of the second plurality of corresponding regions by the plurality of deformation components are configured to cause the flexible housing of the handheld haptic deformation device to deform from a first shape configuration into a second shape configuration that approximates the shape of the virtual object being held by the character in the application, and that is different from the first shape configuration, and wherein the plurality of actuators are configured to substantially maintain the flexible housing in the second shape configuration until another shape input signal is received or generated by the processor.

8. The handheld haptic deformation device of claim 7, wherein the application is executed within the handheld haptic deformation device.

9. The handheld haptic deformation device of claim 7, wherein the handheld haptic deformation device comprises at least one sensor, the processor further configured to:
   receive a sensory input from the at least one sensor, wherein the shape input signal is further based on the sensory input.

10. The handheld haptic deformation device of claim 7, wherein each deformation component of the plurality of deformation components comprises a first portion and a second portion configured to be moved away from each other by a respective actuator of the plurality of actuators, wherein each deformation component of the plurality of deformation components comprises a spring configured to exert forces on the first portion and the second portion of the deformation component in respective directions that would move the first portion and the second portion toward each other.

11. The handheld haptic deformation device of claim 7, wherein each actuator of the plurality of actuators is a rotating actuator configured to move two portions of a respective deformation component away from each other.

12. A non-transitory computer readable medium having computer-executable instructions that, when executed by a processor of a handheld haptic deformation device that has a plurality of deformation components and a plurality of actuators contained within a flexible housing, cause the processor
   to generate a shape input signal when the flexible housing of the handheld haptic deformation device is in a first shape configuration, and wherein the shape input signal is generated based on a shape of a virtual object being held by a character in an application that either is executing on the handheld haptic deformation device or is in communication with the handheld haptic deformation device; and
   to activate the plurality of actuators based on the shape input signal,
   wherein the plurality of actuators are configured to move the plurality of deformation components based on the shape input signal, and wherein movement of the plurality of deformation components by the plurality of actuators causes a first plurality of corresponding regions of the flexible housing of the handheld haptic deformation device to deform in a first direction, and causes a second plurality of corresponding regions of the flexible housing that are opposite to the first plurality of corresponding regions to deform in a second and opposite direction, wherein deformation of the first plurality of corresponding regions by the plurality of deformation components and deformation of the second plurality of corresponding regions by the plurality of deformation components are configured to cause the handheld haptic deformation device to deform into a second shape configuration that is different from the first shape configuration and that approximates the shape of the virtual object being held by the character in the application, and
   to substantially maintain the second shape configuration until another shape input signal is generated or received by the handheld haptic deformation device.

* * * * *